B. M. SNELL.
Seed Planter.
No. 12,561.
Patented Mar. 20, 1855.
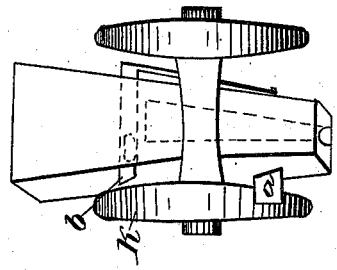
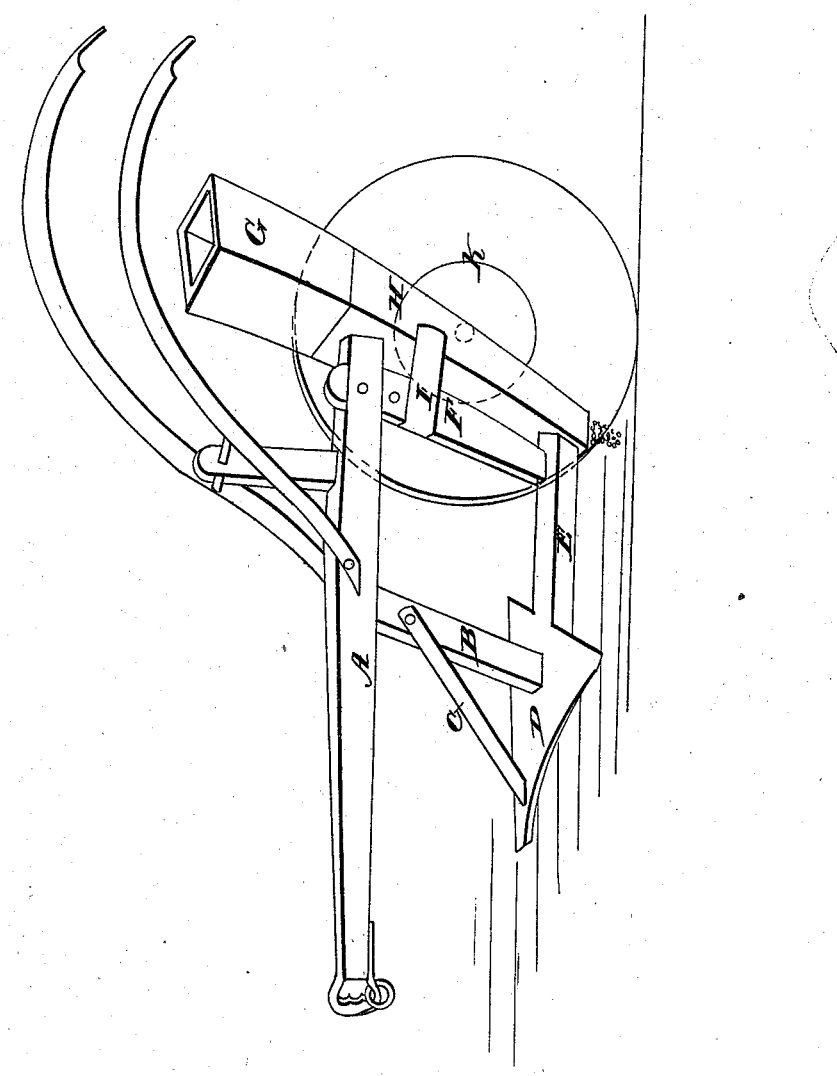

UNITED STATES PATENT OFFICE.

BENJ. M. SNELL, OF HANCOCK, MARYLAND.

IMPROVEMENT IN SEED-PLANTERS.

Specification forming part of Letters Patent No. 12,561, dated March 20, 1855.

*To all whom it may concern:*

Be it known that I, BENJAMIN M. SNELL, of the town of Hancock, in the county of Washington and State of Maryland, have invented a new and useful Improvement in Planting-Plows; and I do hereby declare that the following is a full and exact description thereof, reference being had to the accompanying drawing.

The nature of my improvement consists in so constructing a planting-plow by combining a plow resembling a subsoil one with a seed-dropping apparatus operated by the wheel of the plow, for the purpose of depositing the seed under the surface in the soft and prepared bed, by which the benefit of the improved soil is more fully obtained than it would be if turned up to the air or in leaving an open furrow, so objectionable on account of washing in rolling land or wasting of the volatile constituents of the manure in superficial covering of the seed.

The plow consists of a beam, A, from which descends the stock or colter-post B; C, the colter; D, the share, secured on the post B; E, a bar extending from the rear of the share and united to an upright, F, whose upper end passes through the rear of the beam. This upright is furnished with holes and a pin, by which the plow is made to plant deep or shallow, as required.

The seeding apparatus consists of a hopper, G, and dropping-tube H, secured by a strap, I, to the upright F, and to the end of the beam. This hopper has a sliding bottom and hole therein, by which, when the slide is forced in, an opening is made for the passage of the seed into the tube. On the back of the hopper and dropping-tube is secured the axis of a pair of wheels, K K, one of which is furnished with a cam, *a*, or angular striker, that forces in the slide *b* of the hopper on each rotation of the wheel.

The object of this improvement is to create a soft bed for the reception of the seed in the earth without the disadvantage attending the open furrow, made when the soil is thrown out and the seed frequently deposited on a hard soil or bed, and of course disadvantageously to its growth; also, to obviate a difficulty in planting corn on hillsides, wherein the open furrow made is liable to create a wash of the land in heavy rains occurring soon after planting, which frequently renders replanting necessary, besides the loss of soil where most needed. By this improvement all the properties of a light bed and retention of the fertilizing property of the manure is obtained, particularly where such as guano or other volatile article is used, as it is not thrown to the surface, as would be the case if the ordinary tyne or small mold-board planter were used.

I do not wish it to be considered that I claim novelty in the devices of my plow when considered separately; but, Having described my under-surface planter, what I claim as my invention, and desire to secure by Letters Patent, is—

The construction of a plow wherein a double share, D, is used to open the soil, in combination with a seeding-tube, H, hopper G, striker *a* of wheel K, operating in the manner set forth, for the purpose of depositing seed in the prepared soil without the objection of an open furrow.

In testimony whereof I have hereunto signed my name before two subscribing witnesses.

BENJAMIN M. SNELL.

Witnesses:
S. OLIVER,
SILAS GRAVES.